(12) United States Patent
Muller

(10) Patent No.: US 6,639,139 B2
(45) Date of Patent: Oct. 28, 2003

(54) COLOR-CODED MELODY TEXT AND METHOD OF TEACHING

(76) Inventor: Richard Muller, 121 S. Lucia Ave. #4, Redondo Beach, CA (US) 90277

( * ) Notice: Subject to any disclaimer, the term of this patent is extended or adjusted under 35 U.S.C. 154(b) by 0 days.

(21) Appl. No.: 10/243,514

(22) Filed: Sep. 13, 2002

(65) Prior Publication Data

US 2003/0010182 A1 Jan. 16, 2003

Related U.S. Application Data

(63) Continuation of application No. 09/769,862, filed on Jan. 25, 2001.

(51) Int. Cl.[7] ............................................... G09B 15/00
(52) U.S. Cl. ...................................................... 84/483.1
(58) Field of Search ........................... 84/483.1, 483.2, 84/470 R, 477 R

(56) References Cited

U.S. PATENT DOCUMENTS

| 683,267 | A | | 9/1901 | Froehlich |
| 1,732,980 | A | | 8/1927 | Mooney |
| 3,715,812 | A | * | 2/1973 | Novak ........................ 434/170 |
| 3,771,409 | A | | 11/1973 | Rickey |
| 3,974,733 | A | | 8/1976 | Cournoyer |
| 4,270,284 | A | | 6/1981 | Skellings |
| 4,299,577 | A | | 11/1981 | Marryman |
| 5,567,159 | A | | 10/1996 | Tehan |
| 5,651,678 | A | | 7/1997 | Phillips |
| 6,045,363 | A | | 4/2000 | Phillips |
| 6,127,616 | A | * | 10/2000 | Yu ............................ 84/483.2 |

FOREIGN PATENT DOCUMENTS

| WO | WO 95/22134 | 8/1995 |
| WO | WO 97/16810 | 5/1997 |

* cited by examiner

Primary Examiner—Shih-Yung Hsien
(74) Attorney, Agent, or Firm—Colin P. Abrahams

(57) ABSTRACT

A visually enhanced teaching text comprises a series of words to be sung, the series of words having a plurality of tropes each having a predetermined tune. The text also includes symbols in the text indicative of the start and end of a trope, with at least some of the tropes being associated with a particular distinctive color so that each trope in the series of words is clearly distinguishable from surrounding tropes therein. The invention is also for a singing teaching method using color coded backgrounds.

14 Claims, 4 Drawing Sheets

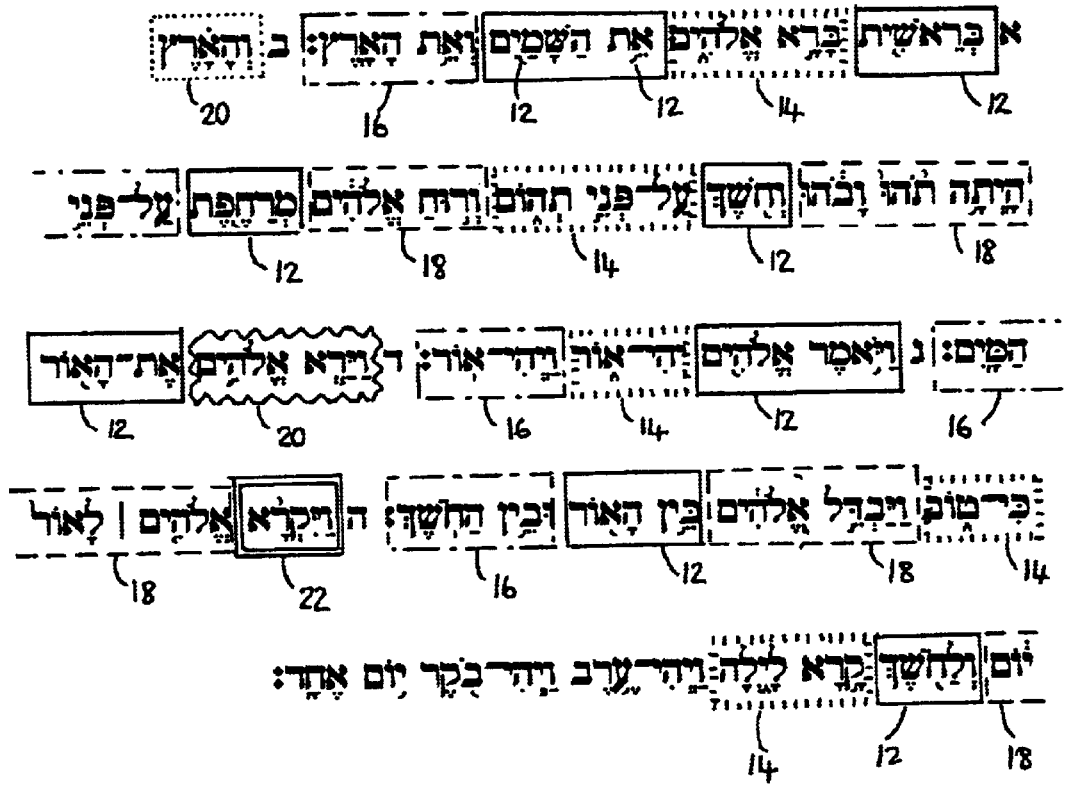

| Common tropes | | | | Symbol | |
|---|---|---|---|---|---|
| 1. | Mercha ⌐ | tipcha ⌐ | | ⌐ | ⌐ |
| 2. | Munach ⌐ | etnachta λ | | L | λ |
| 3. | Sof pasuk | | | | ǀ |
| 4. | Mapach ⌐ | pashta ⌐ | | < | ⌐ |
| 5. | Munach ⌐ | zakef-katon : | | ⌐ | : |
| 6. | R'vi-ee, ↓ | munach l'garmei ↓ | | ǀ | ⌐ |
| 7. | Kadma ⌐ | v'azla ⌐ | | ⌐ | ⌐ |
| 8. | Darga t'vir ⌐ ⌐ | | | ⌐ | ⌐ |

Less common tropes

| 9. | Y'tiv | ↑ |
|---|---|---|
| 10. | Gershayim | ǁ |
| 11. | Zarka, segol | ∴ ∾ |
| 12. | T'lisha k'tana | ᛩ |
| 13. | T'lisha g'dola | ℘ |
| 14. | Pazer | ⋎ |
| 15. | Zadef-gadol | ǀ: |
| 16. | Shalshelet (very rare) | ⌇ |
| 17. | Karnei Parah | ⋎ ℘ |
| 18. | Yareach ben Yomo | ⊤ |
| 19. | Mercha Kefula | ⌐ |

| Trope | Possible Color Background | Key from figure 3 |
|---|---|---|
| 1. Mercha tipcha | Yellow | |
| 2. Munach etnachta | Green | |
| 3. Sof pasuk | Red | |
| 4. Mapach pashta | Blue | |
| 5. Munach zakef-katon | Blue | |
| 6. R'vi-ee, munach l'garmei | Pink | |
| 7. Kadma v'azla | Orange | |
| 8. Darga t'vir | Purple | |

FIGURE 4

COLOR-CODED MELODY TEXT AND METHOD OF TEACHING

CROSS REFERENCE TO RELATED APPLICATIONS

This is a continuation application of U.S. patent application Ser. No. 09/769,862 filed Jan. 25, 2001, which is incorporated herein in its entirety.

FIELD AND BACKGROUND OF THE INVENTION

This invention relates to color-coded melody text and a method for teaching melodies. The invention has particular application with respect to singing or chanting religious or liturgical texts which form part of the services in a Jewish synagogue or temple.

Color-coding and/or other types of coding of text are well known, especially in the area of teaching reading to young learners. For example, U.S. Pat. No. 5,567,159 (Tehan) teaches that various visual indicator members are provided to represent vowel letters and consonant letters of various types, with each visual indicator having a unique color characteristic. U.S. Pat. No. 4,299,577 (Marryman) discloses and invention which is intended to help an early or beginning reader learn how to associate basic sounds of consonants and vowels by using a visual code.

Among other patents using color as a teaching method, U.S. Pat. No. 4,270,284 (Skellings) uses high speed electrical processing means such as a microcomputer system for generating the language text and color emphasis, as well as the interrelationship therebetween. U.S. Pat. No. 3,715,812 (Novak) uses a color coded system for letters of the English alphabet, and this is intended to help readers in the pronunciation and reading of various words. U.S. Pat. No. 683,267 (Froehlich) teaches reading by having the syllables of a word appearing in contrasting colors.

Different methods for teaching music, although not using color specifically, are set out in U.S. Pat. Nos. 6,045,363, 5,651,678 and 3,974,733. U.S. Pat. No. 3,771,409 uses color as a teaching device for properly locating fingerboard and notation regions.

SUMMARY OF THE INVENTION

According to one aspect of the invention, there is provided a method of teaching a melody for a series of words to be sung, the melody and words being comprised at least in part of a series of repetitive tropes each having a predetermined tune, the method comprising: selecting a first trope in the melody and isolating each occurrence of the first trope in the melody; highlighting each occurrence of the first trope in the melody with a distinctive first color; and selecting and highlighting with a distinctive different colors each occurrence of at least one other trope in the melody so that the first and other tropes will stand out from surrounding tropes in the melody. In one form, the series of words comprise sacred text from the Torah, Haftorah and/or Megillot.

Preferably, each trope is highlighting by placing it on a background of a contrasting color. Further, all common tropes may be isolated and highlighted, each trope being highlighted with a different color.

According to another aspect of the invention, there is provided a visually enhanced teaching text comprising a series of words to be sung, the series of words having a plurality of tropes each having a predetermined tune, symbols in the text indicative of the start and end of a trope, at least some of the tropes being associated with a particular distinctive color so that each trope in the series of words is clearly distinguishable from surrounding tropes therein.

The text within a trope may be highlighted by providing a contrast color background; the text within a trope may be comprised of a particular color; and/or the text may be comprised of an outline or border and the inside of the outline is filled with a selected color.

The teaching text may further comprise an associated musical score sheet comprising the tune of a trope in musical notation form and color codings thereon corresponding to the distinctive color used in the text.

In one form, the text is a sacred text selected from one or more of the Torah, Haftorah, and Megillot. The text may be contained within a book, the text comprising appropriate portions from the Torah, Haftorah, and/or Megillot for a specific Jewish Sabbath or Holiday.

According to another aspect of the invention, there is provided a method of visually illustrating the melody of a text comprising a series of words to be sung, the words being comprised at least in part of a series of repetitive tropes with each trope having a predetermined tune, the method comprising: selecting a first trope in the melody and isolating each occurrence of the first trope in the melody; highlighting each occurrence of the first trope in the melody with a distinctive color; and selecting and highlighting with a distinctive color at least one other trope in the melody so that the first and each other trope will stand out from surrounding tropes in the melody.

In one aspect, this invention is directed toward the teaching of songs and melodies by color-coding various words and phrases in a text, with each color representing a specific tune. The invention has a particular application and use in the teaching of young Jewish students in their training for Bar Mitzvah and Bat Mitzvah. It will, however, be appreciated that the invention is not intended to be limited to this specific application.

In the Jewish religion, there are certain sacred texts which are read during temple and synagogue services throughout the year. Some of the most important of these texts are: the "Torah", which consists of the first five books of the Old Testament of the Bible (the five Books of Moses) and constitutes the holiest writings of Judaism; the "Haftorah", which comprises various passages from the Book of the Prophets in the Old Testament; and the five "Megillot" (the five special readings from Ruth, Esther, Song of Songs, Ecclesiastes and Lamentations) On each Sabbath and Holiday day during the year, a particular portion from the Torah is read during services. Furthermore, each Torah portion has an associated Haftorah, which is read on the same day. Following the ancient traditions, the entire Torah is read, in portions, over a period of a year, or every three years (triennial cycle) and, at the end thereof, the cycle is repeated.

It is traditional for every young Jewish boy or girl undergoing Bar or Bat Mitzvah (Bar Mitzvah is for the male and means "son of the law", while Bat Mitzvah is for the female and means "daughter of the law") to read at least a part of the selected Torah and Haftorah portion for the particular Sabbath or Holiday on which the Bar or Bat Mitzvah occurs. These portions are not simply read, but are chanted or sung in a tune consisting of repetitive sections. These repetitive sections are called "tropes". In this specification, therefore, a "trope" is intended to mean a word, words or a phrase which are sung in a certain tune or melody.

Certain texts of the Torah, Haftorah and Megillot all have designated tropes written in as part thereof, and the text therefore comprises a specific tune which is the sum total of the tropes making up that text. In the text, the tropes are represented by notational symbols adjacent or associated with the words, so that an experienced singer, or cantor, can easily sing the text by reading these notational symbols.

However, the task is much more difficult for young boys and girls who may also be not fully fluent in reading the Hebrew text. Thus, for a young reader, not only do the Hebrew words have to be read, but the notational symbols must also be processed so that the Hebrew words can be chanted according to the melody designated by the tropes.

It should be mentioned at this point that a notational symbol representing a particular trope will typically have the same melody from one place to another, i.e. cantors or choirs in different communities and even countries will sing a trope melody with substantially the same tune. However, it is possible that disparate groups of Jews, or congregations, may sing a particular trope in a slightly different (or even very different) tune from others. The important point is that, in any one congregation or place, when a notational symbol for a particular trope appears in the Hebrew text, this trope is always sung in the same repetitive tune by that singer.

This invention is therefore directed at facilitating the teaching process for persons learning Hebrew reading and the chanting of the text by color-coding each trope so that it will stand out and be easily distinguishable to the reader, without having to locate and identify the notational symbols of the trope. This is desirable, especially for the novice, since the notational symbol(s) for the trope are often similar to the vowels in Hebrew text, making them more difficult to identify and read.

Although this invention has a particularly useful application in teaching the chant of the sacred Hebrew texts of the Jewish religion, it is, in principle, equally applicable to teaching melody in any song or chant which is comprised of a series of repetitive melodic segments, each of substantially similar tune. Thus, the color-coding and/or highlighting method, as well as the resulting text produced thereby, may be used to teach the chant of texts in other religious liturgies, as well as ancient and modern songs.

The detailed embodiments of the invention set out below will be described with reference to the Hebrew text, but, as mentioned above, the principles will apply equally well in teaching any song with repetitive segments of substantially the same melody.

BRIEF DESCRIPTION OF THE DRAWINGS

FIG. 1 is a diagram showing the names of the tropes used in Hebrew texts, and their respective notational symbols;

FIG. 2 is a musical score sheet showing, in one version only, the tune or melody of a variety of tropes, as well as the notational symbol for them;

FIG. 3 is a representative example of text from a Torah portion, including the vowels and the various identifying tropes appearing therein; and FIG. 4 is a key showing and identifying each particular trope indicated in the text of FIG. 3, and a key indicating one possibility of color-coding for each of the tropes.

DETAILED DESCRIPTION OF THE PREFERRED EMBODIMENTS

As is illustrated and will be described with reference to the attached drawings, the Torah, Haftorah and Megillot, sacred Hebrew texts read and chanted during Sabbath and other religious Holiday services, are chanted in repeating patterns of musical notes, each such pattern being referred to as a "trope". These tropes are designated in the Hebrew text by specific notational symbols associated with each word, words or a phrase. In accordance with one aspect of this invention, each such trope is highlighted with a specific color, or is provided with a color-coded background, or has colored-in or color filled letters, so that they stand out distinctively and clearly from surrounding tropes, and thus aide the beginner in learning to identify a trope, and thereafter read and chant the text.

As shown in FIG. 1 of the drawings, there are nineteen tropes used as melody guides in singing the Hebrew texts. Of these nineteen tropes, eight are very common, a further eight are less common, and three appear very rarely. All of the tropes are assigned Hebrew names as indicated in FIG. 1, and each has a notational symbol which is positioned adjacent or in association with the words in the text which are to be sung in the melody of that trope. For the first eight tropes, which are by far the most common tropes and appear most frequently, the typical notational symbol used in the text to identify such a trope is provided alongside the name.

With reference to FIG. 3 which shows text from a Torah portion, the trope "mercha tipcha" in the text is identified by reference numeral 12. The words in this trope are placed in a solid box, and are sung according to a particular tune or melody. As will be described below, the box illustrated in FIG. 3 is intended only as an identifier of the words in this trope and these words would, in accordance with the invention, be highlighted with a specific color to assist the reader/singer in immediately identifying the trope and the melody for the words therein.

As shown in FIG. 3, the words in the text comprise a series of consonants, which are the large upper symbols, and vowels, which are the smaller symbols located generally below the letter. In addition to the vowels, the notational symbol for the tropes are provided. Thus, the notational symbol for the tropes for "mercha tipcha" are shown by reference numerals 12.

The trope "munach etnachta" is identified with reference numeral 14; the trope "sof pasuk" is identified by reference numeral 16; the trope "mapach pashta" is identified with reference numeral 18; the trope "munach zakef-katon" is identified by the same reference numeral 18 (as was "mapach pashta") on account of their frequent pairing (the tropes are in the same family—they appear together frequently); the trope "munach l'garmei r'vi-ee" is identified by reference numeral 20; the trope "kadma v'azlah" is identified by reference numeral 22, and the trope "darga t'vir" is identified by reference numeral 24.

On account of the relative rarity of tropes 9 to 16 illustrated in FIG. 1 of the drawings, these tropes may typically be non-highlighted in a preferred embodiment of the invention. In other words, these tropes will stand out from the eight common tropes by not being highlighted at all, though they will not stand out with respect to each other. The learner will simply realize, upon encountering a non-highlighted word or words, that this represents one of the less common tropes, which will have to be chanted differently than the common tropes. Alternatively, one or more of these less common tropes 9 to 19 can be assigned a color to distinguish them to the reader or learner in much the same way as those indicated with respect to tropes 1 to 8.

FIG. 4 is a key to the boxes in which the words comprising the tropes have been placed. In one preferred embodiment, as shown in FIG. 4, the particular trope identified by a specific box would be assigned the color indicated. It will, of course, be appreciated that the color assigned to a particular trope in this box is purely arbitrary, and any color for a particular trope can be used. As long as each trope has a different color from the other tropes, it is of no particular relevance what color that may be.

With reference to FIG. 2 of the drawings, there is a shown a musical score representing, in one form only, a particular tune or melody of a specific trope. While the melody of each trope noted in the score may be a common version for singing that trope, it is to be understood that different congregations, groups of people or geographic areas may use variations of the melody, or indeed, completely different melodies. The important point is that a specific trope will, in a congregation, group etc., always be sung using the same melody for that trope, making the color highlighting method and text of the invention appropriate for learners and users irrespective of the specific melody which any group may ascribe or assign to a trope.

In the musical score illustrated in FIG. 2, the tropes may be color-coded using background or specific letter coloring, with the coloring corresponding to that used in the texts. The name of the trope, the musical notes, or the notational symbol of the trope may all be colored according to the color assigned that trope, or only one or two of these may be colored. This musical score chart may be a further useful tool incorporated as a tie-in and which helps the learner in understanding, identifying and singing the words within the tropes.

In order to facilitate the teaching of the chant or song, the dark Hebrew text, usually black, is typically highlighted, so that the respective word or group of words in a trope is/are all highlighted with the same color. However, in a modification, the text can in fact be printed so that the letters themselves are in the particular assigned color of the trope. Or, the letters may have a dark border with a color fill in.

As mention above, each Sabbath or Holiday day in the Jewish religion is associated with the reading of a particular portion of the Torah and Haftorah, and it is usual for small booklets to be published, each book being specific to a particular Sabbath or Holiday service by containing only the portions being read on that day. In accordance with the invention, various books may be published, each one having the specific portions for a Sabbath or Holiday reading, and the books may comprise the regular text as seen in a Torah and Haftorah, together with the text including vowel sounds and notational symbols indicating the trope, as well as yet a further text showing the words and phrases highlighted with a specific color, according to the trope with which they are associated. Additionally, various texts including "phase-outs" of some of the colors, when the learner is more comfortable with the reading of the notational symbols themselves, may be used to graduate the learner from a fully highlighted color-coded text, to one having no highlights at all. This graduated teaching method would be most useful for new learners, especially those unfamiliar with Hebrew text and reading Hebrew, and who are learning to read Hebrew as well as the notational symbols representing the melody of a trope.

In essence, however, the invention may be used for any text, whether comprised of alphabet letters, music notes, or other symbols, where the text is highlighted with color, so that a particular color represents a specific melody which repeats throughout the chanting of that text.

What is claimed is:

1. A method of teaching a melody for a series of words to be sung, the melody and words being comprised at least in part of a series of repetitive tropes the method comprising:

selecting a first trope in the melody having a first predetermined tune and isolating each occurrence of the first trope in the melody, highlighting each occurrence of the first trope in the melody with a distinctive first color, and selecting and highlighting with a distinctive different color each occurrence of at least one other trope each having a unique predetermined tune in the melody so that the first and other tropes will stand out from surrounding tropes in the melody.

2. A method as claimed in claim 1 wherein the series of words comprise sacred text from the Torah, Haftorah and/or Megillot.

3. A method as claimed in claim 1 wherein each trope is highlighted by placing it on a background of a contrasting color.

4. A method as claimed in claim 1 wherein all common tropes are isolated and highlighted, each trope being highlighted with a different color.

5. A method as claimed in claim 4 wherein highlights are removed from a particular trope when a user of the method has become familiar with that trope.

6. A visually enhanced teaching text comprising a series of words to be sung, the series of words being comprised of a plurality of tropes each having a unique and predetermined tune, symbols in the text indicative of the start and end of a trope, at least some of the tropes being associated with a particular distinctive color so that each trope in the series of words is clearly distinguishable from surrounding tropes therein.

7. A teaching text as claimed in claim 6 wherein all common tropes in the text are highlighted.

8. A teaching text as claimed in claim 6 wherein the text within a trope is highlighted by providing a contrast color background.

9. A teaching text as claimed in claim 6 wherein the text within a trope is comprised of a particular color.

10. A teaching text as claimed in claim 6 wherein the text is comprised of an outline or border and the inside of the outline is filled with a selected color.

11. A teaching text as claimed in claim 6 further comprising an associated musical score sheet comprising the tune of a trope in musical notation form and color codings thereon corresponding to the distinctive color used in the text.

12. A teaching text as claimed in claim 6 wherein the text is a sacred text selected from one or more of the Torah, Haftorah, and Megillot.

13. A teaching text as claimed in claim 12 when contained within a book, the text comprising appropriate portions from the Torah, Haftorah, and/or Megillot for a specific Jewish Sabbath.

14. A method of visually illustrating the melody of a text comprising a series of words to be sung, the words being comprised at least in part of a series of tropes, the method comprising:

selecting a first trope in the melody having a first predetermined tune and isolating each occurrence of the first trope in the melody, highlighting each occurrence of the first trope in the melody with a distinctive color, selecting and highlighting with a distinctive color at least one other trope each having a unique predetermined tune in the melody so that the first and each other trope will stand out from surrounding tropes in the melody.

\* \* \* \* \*